(12) United States Patent
Walker et al.

(10) Patent No.: US 7,498,384 B2
(45) Date of Patent: Mar. 3, 2009

(54) MULTI-COMPONENT EPOXY-AMINE PRIMER SYSTEMS COMPRISING A POLYTHIOETHER

(75) Inventors: John A. Walker, Los Angeles, CA (US); Scott C. Peterson, Spokane, WA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 428 days.

(21) Appl. No.: 11/346,114

(22) Filed: Feb. 2, 2006
(Under 37 CFR 1.47)

(65) Prior Publication Data

US 2007/0054128 A1 Mar. 8, 2007

Related U.S. Application Data

(60) Provisional application No. 60/650,420, filed on Feb. 4, 2005.

(51) Int. Cl.
*B05B 3/02* (2006.01)
*B32B 15/092* (2006.01)
*C08K 3/10* (2006.01)
*C08K 3/36* (2006.01)
*C08L 63/00* (2006.01)
*C08L 63/02* (2006.01)

(52) U.S. Cl. .................. 525/113; 156/330; 428/415; 428/418; 523/428; 523/458; 523/466; 525/423; 525/524; 525/530; 525/533

(58) Field of Classification Search .......... None
See application file for complete search history.

(56) References Cited

U.S. PATENT DOCUMENTS

| | | | | |
|---|---|---|---|---|
| 3,484,418 A * | 12/1969 | Vandenberg et al. | ........ | 528/374 |
| 3,660,523 A | 5/1972 | Grawe et al. | ............. | 260/830 P |
| 4,075,153 A | 2/1978 | Leo | ......................... | 260/37 EP |
| 4,520,144 A | 5/1985 | Noren et al. | ................. | 523/435 |
| 6,172,179 B1 | 1/2001 | Zook et al. | ................... | 528/373 |
| 6,217,945 B1 | 4/2001 | Fowler | ........................ | 427/410 |
| 7,037,958 B1 * | 5/2006 | Hansen et al. | .............. | 523/428 |
| 7,067,612 B2 * | 6/2006 | Cosman | ...................... | 528/373 |
| 2005/0010003 A1 * | 1/2005 | Sawant et al. | ................ | 525/523 |
| 2005/0288456 A1 | 12/2005 | Morkunas et al. | ........... | 525/528 |

FOREIGN PATENT DOCUMENTS

| | | |
|---|---|---|
| EP | 0 160 622 | 4/1985 |
| EP | 0 650 500 | 5/1997 |
| JP | 08060047 | 5/1996 |
| WO | WO 2004/033523 A1 | 4/2004 |

OTHER PUBLICATIONS

"Modification of DGEBA with Diimide-Diacids Derived from Bicyclo[2.2.2]oct-7-ene-2,3,5,6-tetracarboxylic Dianhydride and Crosslinking Study", by M. Galia et al., Journal of Applied Polymer Science, vol. 60, No. 12, pp. 2177-2183 (1996).

"Synthesis and Curing of New Epoxycycloaliphatic Polyesterimides with Dianhydrides and Diisocyanates as Hardeners", by D. Monte et al., Journal of Applied Polymer Science, vol. 61, No. 12 pp. 2179-2184 (1996).

"Synthesis and Properties of Cationic Resins Derived from Polyether/Polyester-Modified Epoxy Resins", by Lung-Ta Lee, et al., Journal of Applied Polymer Science, vol. 46, No. 6, pp. 991-1000 (1992).

"Synthesis and Evaluation of Properties of Chemiresistant Epoxyfumaric Resins", by T. Matynia et al., Polimery, vol. 35, No. 1/2, pp. 14-17 (1990).

"Synthesis and Properties of Urethane Elastomer-Modified Epoxy Resin Having Hydroxymethyl Group", by K. Ohtsuka et al., Polymer International, vol. 33, No. 1, pp. 93-102 (1994).

* cited by examiner

*Primary Examiner*—Robert Sellers
(74) *Attorney, Agent, or Firm*—Donald R. Palladino

(57) ABSTRACT

Multi-component epoxy-amine primer systems are disclosed, which comprise an amine component that comprises a polythioether. Also disclosed are substrates coated with such primer systems as well as methods for coating substrates with such primer systems.

19 Claims, No Drawings

MULTI-COMPONENT EPOXY-AMINE PRIMER SYSTEMS COMPRISING A POLYTHIOETHER

CROSS-REFERENCE TO RELATED APPLICATIONS

This application claims the benefit of U.S. Provisional Patent Application Ser. No. 60/650,420, filed Feb. 4, 2005, which is incorporated by reference herein in its entirety.

FIELD OF THE INVENTION

The present invention is directed to multi-component epoxy-amine primer systems. More particularly, the present invention relates to multi-component primer systems comprising an epoxy component comprising a curable resinous polyepoxide, and an amine component comprising an amine and a polythioether polymer. The present invention is also directed to substrates coated with such primer systems and methods for coating substrates with such primer systems.

BACKGROUND OF THE INVENTION

Epoxy-amine coatings, including those that contain chromate, are used in the aircraft industry as primers for paints. The primer provides an intermediate layer that forms a strong bond with the metallic surface, often aluminum, and provides an outer surface to which topcoats can bond strongly. In addition to adhesion to the topcoat, the primer may also serve to inhibit corrosion of the underlying metal. This corrosion resistance includes the capacity to protect the metal surface covered by the primer as well as the capacity to extend the protection beyond the edge of the primer coating and prevent adjacent uncoated surfaces from corroding. This can be relevant in the aircraft industry due to the various corrosive fluids used, such as jet fuel, brake fluid, and the like. It is also desirable that such primers have sufficient flexibility to withstand the severe cold to which aircraft are exposed. Impact resistance is also desirable and again relevant in light of the noise and vibration to which aircraft are subjected.

SUMMARY OF THE INVENTION

In certain respects, the present invention is directed to multi-component epoxy-amine primer systems comprising (i) an epoxy component comprising a curable resinous polyepoxide, and (ii) an amine component comprising an amine and a polythioether polymer. Such primer systems can, in many cases, result in primer coatings that exhibit improved impact resistance properties as compared to similar multi-component epoxy-amine primer systems that do not include an amine component that comprises a polythioether polymer.

The present invention is also directed to substrates at least partially coated with such primer systems as well as methods for coating substrates with such primer systems.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In this application, the use of "or" means "and/or" unless specifically stated otherwise.

The present invention is directed to multi-component epoxy-amine primer systems comprising (i) an epoxy component comprising a curable resinous polyepoxide, and (ii) an amine component comprising an amine and a polythioether polymer. As used herein, the term "multi-component" refers to coating compositions that include more than one component, such as those that include two components ("2K systems"), wherein the components are stored separately and then mixed at or near the time of use. As used herein, the term "primer system" refers to coating compositions suitable for use as an intermediate layer that can form a bond with a metallic substrate, such as aluminum, and can provide an outer surface to which topcoats can bond.

The multi-component epoxy-amine primer systems of the present invention comprise an epoxy component, which comprises a curable resinous polyepoxide. As used herein, the term "curable" refers to the capability of a compound to undergo one or more chemical reactions to form stable, covalent bonds among the constituent components. Suitable resinous polyepoxides that may be used in the primer systems of the present invention include diglycidyl ethers of bisphenol A, diglycidyl ethers of bisphenol F, glycidyl ethers of bisphenol, epoxylated novolacs, and the like. The curable resinous polyepoxide often has a molecular weight of 250 to 1500, such as 300 to 550. Such resinous polyepoxides can be prepared by the reaction of epichlorohydrin with a polyhydric organic compound, or can be purchased, for example, from Resolution Products, in their EPON line of products, or Ciba Specialty Chemicals in their ARALDITE line of products. The curable resinous polyepoxide should be chosen to give the epoxy component the desired viscosity without the need for high VOC level and also any other desired properties, such as flexibility.

In certain embodiments, the epoxy component also comprises a liquid vehicle, such as an organic solvent. Suitable organic solvents include butylacetate and isopropyl alcohol, OXSOL 100, xylene, butanol, and the like. In certain embodiments, the curable resinous polyepoxide comprises from 10 to 30 weight percent of the epoxy component, such as 20 weight percent, and 90 to 70 weight percent solvent and/or other components, with weight percent being based on the total weight of the epoxy component. In certain embodiments, the solvent content of the epoxy component is no more than 60 weight percent, with weight percent being based on the total weight of the epoxy component.

If desired, other resins may be included within the epoxy component of the epoxy-amine primer systems of the present invention. In certain embodiments, for example, the epoxy component further comprises "standard" epoxy materials, such as those available from Resolutia in their EPON line of products; such epoxies may, in certain embodiments, comprise 10 to 50 weight percent of the epoxy component.

As mentioned previously, the multi-component epoxy-amine primer systems of the present invention comprise an amine component, which comprises an amine and polythioether polymer. Suitable amines include those materials that contain a plurality of, i.e., at least two, amino hydrogen atoms in order to effect cure with the curable resinous polyepoxide present in the epoxy component. Numerous amines are suitable for this purpose, such as aliphatic and cycloaliphatic amines; such as diethylene triamine and triethylene tetraamine. Aromatic amines, such as methylene dianiline, can also be used as can amidoamines or polyamides.

In certain embodiments, the amine component comprises a polyamine, such as primary or secondary diamines or polyamines, wherein the radicals attached to the nitrogen atoms can be saturated or unsaturated, aliphatic, alicyclic, aromatic, aromatic-substituted aliphatic, aliphatic-substituted aromatic, or heterocyclic. In certain embodiments, the polyamine includes mixed amines in which the radicals are different, such as, for example, aromatic groups, aliphatic groups, and other non-reactive groups attached to the carbon atoms, such as oxygen, sulfur, halogen, or nitro groups. Examples of suitable aliphatic and alicyclic diamines include 1,2-ethylene diamine, 1,2-propylene diamine, 1,8-p-menthane diamine, isophorone diamine, propane-2,2-cyclohexyl amine, and methane-bis-(4-cyclohexyl amine), and

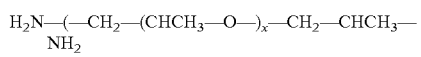

wherein x is from 1 to 10.

In certain embodiments, the polyamine includes phenylene diamines and toluene diamines, such as, for example, o-phenylene diamine and p-tolylene diamine, and N-alkyl and N-aryl derivatives thereof, such as, for example, N,N'-dimethyl-o-phenylene diamine, N,N'-di-p-tolyl-m-phenylene diamine, and p-amino-diphenylamine.

In certain embodiments, the polyamine may be a polynuclear aromatic diamine in which the aromatic rings are attached by means of a valence bond, such as, for example, 4,4'-biphenyl diamine, methylene dianiline, and monochloromethylene dianiline.

The amine component of the primer systems of the present invention also comprises a polythioether polymer. Suitable polythioether polymers include mercapto-terminated polymers prepared by reacting reactants comprising (i) one or more polythiol materials, and (ii) one or more polyvinyl ether materials.

As used herein, the term "polythiol" refers to compounds, monomers, or polymers comprising at least two thiol groups, —SH. Suitable polythiol materials include, for example, dithiols having the formula (I):

HS—R—SH           (I)

where R denotes a $C_{2-10}$ n-alkylene group; a $C_{2-6}$ branched alkylene group, which may have one or more pendant groups which can be, for example, hydroxyl groups, alkyl groups, such as methyl or ethyl groups, and/or alkoxy groups; a $C_{6-8}$ cycloalkylene group; a $C_{6-10}$ alkylcycloalkylene group; or a —[(—CHR)$_p$—X—]$_q$—(—CHR)$_r$— group; wherein p is an integer ranging from 2 to 6, q is an integer ranging from 1 to 5, r is an integer ranging from 2 to 10, and R is hydrogen or methyl.

In certain embodiments, dithiols suitable for use in preparing the polythioether polymer used in the present invention may include one or more heteroatom substituents in the carbon backbone, that is, in which X includes a heteroatom, such as O, S or another bivalent heteroatom radical; a secondary or tertiary amine group, i.e., —NR—, where R is hydrogen or methyl; or another substituted trivalent heteroatom. In certain embodiments, X is O or S, and thus R in formula (I) is —[(—CHR)$_p$—O—]$_q$—(—CHR)$_r$— or —[(—CHR)$_p$—S—]$_q$—(—CHR)$_r$—. In certain embodiments, p and r are equal, such as where p and r are both two.

Examples of specific dithiols suitable for use in preparing the polythioether polymers used in the present invention include, without limitation, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. The polythiol material can have one or more pendant groups selected from lower alkyl groups, lower alkoxy groups and hydroxyl groups. Suitable alkyl pendant groups include $C_1$-$C_6$ linear alkyl, $C_3$-$C_6$ branched alkyl, cyclopentyl, and cyclohexyl.

Other examples of specific dithiols suitable for use in preparing the polythioether polymers used in the present invention include dimercaptodiethylsulfide (DMDS) (in formula (I), R is —[(—CHR)$_p$—X—]$_q$—(—CHR)$_r$— as described above, wherein p is 2, r is 2, q is 1, X is S); dimercaptodioxaoctane (DMDO) (in formula (I), R is —[(—CHR)$_p$—X—]$_q$—(—CHR)$_r$— as described above, wherein p is 2, q is 2, r is 1, X is 0); and 1,5-dimercapto-3-oxapentane (in formula (I), R is —[(—CHR)$_p$—X—]$_q$—(—CHR)$_r$— as described above, wherein p is 2, r is 2, q is 1, X is O). In certain embodiments, the dithiols may include both heteroatom substituents in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Polythiol materials suitable for use in preparing the polythioether polymers used in the present invention include, for example, those polythiols identified above, including mixtures of two or more thereof.

Polyvinyl ether materials suitable for use in preparing the polythioether polymers used in the present invention include, for example, divinyl ethers having the formula (II):

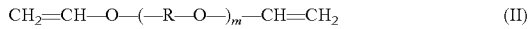           (II)

where R is a $C_{2-6}$ n-alkylene group, a $C_{2-6}$ branched alkylene group, a $C_{6-8}$ cycloalkylene group, a $C_{6-10}$ alkylcycloalkylene group, or —[(—CHR)$_p$—X—]$_q$—(—CHR)$_r$—, where m is a rational number ranging from 0 to 10, p is an integer ranging from 2 to 6, q is an integer ranging from 1 to 5, and r is an integer ranging from 2 to 10.

The materials of formula (II) are divinyl ethers. Suitable divinyl ethers include those compounds having at least one oxyalkylene group, such as from 1 to 4 oxyalkylene groups, i.e., those compounds in which m is an integer from 1 to 4. In some cases, m is an integer from 2 to 4. It is also possible to employ commercially available divinyl ether mixtures to produce the polythiol polymers that may be used to produce the polymers of the present invention. Such mixtures are characterized by a non-integral average value for the number of alkoxy units per molecule. Thus, m in formula (II) can also take on rational number values between 0 and 10.0, such as between 1.0 and 10.0, between 1.0 and 4.0, or between 2.0 and 4.0.

Suitable polyvinyl ether monomers from which polythiol polymers may be prepared include divinyl ether monomers, such as divinyl ether, ethylene glycol divinyl ether (EG-DVE) (R in formula (II) is ethylene and m is 1), butanediol divinyl ether (BD-DVE) (R in formula (II) is butylene and m is 1), hexanediol divinyl ether (HD-DVE) (R in formula (II) is hexylene and m is 1), diethylene glycol divinyl ether (DEG-DVE) (R in formula (II) is ethylene and m is 2), triethylene glycol divinyl ether (R in formula (II) is ethylene and m is 3), tetraethylene glycol divinyl ether (R in formula (II) is ethylene and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and mixtures of two or more such polyvinyl ether monomers. The polyvinyl ether material can have one or more pendant groups selected from alkyl groups, hydroxyl groups, alkoxy groups and amine groups.

Useful divinyl ethers in which R in formula (II) is $C_{2-6}$ branched alkylene can be prepared by reacting a polyhydroxy compound with acetylene. Exemplary compounds of this type include compounds in which R in formula (II) is an alkyl-substituted methylene group such as —CH(CH$_3$)— (for example "PLURIOL®" blends such as PLURIOL®E-200 divinyl ether (BASF Corp. of Parsippany, N.J.), for which R in formula (IV) is ethylene and m is 3.8) or an alkyl-substituted ethylene (for example —CH$_2$CH(CH$_3$)— such as "DPE" polymeric blends including DPE-2 and DPE-3 (International Specialty Products of Wayne, N.J.)).

Other useful divinyl ethers include fluorinated compounds or compounds in which R in formula (II) is polytetrahydrofuryl (poly-THF) or polyoxyalkylene, such as those having an average of about 3 monomer units.

Two or more polyvinyl ether monomers of the formula (II) can be used. Thus, in some embodiments, two polythiols of formula (I) and one polyvinyl ether monomer of formula (II), one polythiol of formula (I) and two polyvinyl ether monomers of formula (II), two polythiols of formula (I) and two polyvinyl ether monomers of formula (II), and more than two compounds of one or both formulas, can be used to produce a variety of polymeric polythiols that may be used to prepare the polythioether polymers used in the present invention.

In some cases, the polyvinyl ether monomer comprises 20 to less than 50 mole percent of the reactants used to prepare the polythioether polymer, and, in some cases, 30 to less than 50 mole percent.

The polythioether polymers described above can be prepared by a number of methods. In certain embodiments, relative amounts of polythiol and divinyl ether materials used to prepare the aforementioned polythioether polymers are chosen to yield terminal mercapto groups (—SH). Thus, in some cases, (>n, such as n+1) moles of a polythiol having the formula (I) or a mixture of at least two different compounds having the formula (I), are reacted with (n) moles of a divinyl ether having the formula (II) or a mixture of at least two different compounds having the formula (II).

The reaction between the compounds of formulas (I) and (II) may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a cationic photoinitiating moiety. Ionic catalysis methods, using either inorganic or organic bases, e.g., triethylamine, also yield useful materials. Examples of suitable free-radical, azo-type, catalysts are Vazo®-57, Vazo®-64, and Vazo®-67 (DuPont), and V-70® and V-65B® (Waco Specialty Chemicals).

Polythioether polymers suitable for use in the amine component of the primer systems of the present invention may be prepared by combining at least one compound of formula (I) and at least one compound of formula (II) followed by addition of an appropriate catalyst, and carrying out the reaction at a temperature from about 30° C. to about 120° C., such as about 70° C. to about 90° C., for a time from about 2 to about 24 hours, such as about 2 to about 6 hours.

An exemplary linear structured polythioether polymer suitable for use in the amine component of the primer systems of the present invention has the structure of formula (III):

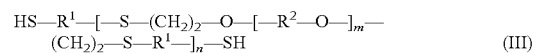

$$HS-R^1-[-S-(CH_2)_2-O-[-R^2-O-]_m-(CH_2)_2-S-R^1-]_n-SH \quad (III)$$

wherein $R^1$ denotes a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, —[(—CHR—)$_p$—X—]$_q$—(—CHR—)$_r$—, wherein R is hydrogen or methyl and X denotes O, S, or —NHR—, wherein R denotes hydrogen or methyl; $R^2$ denotes a $C_{2-10}$ n-alkylene group, a $C_{2-6}$ branched alkylene group, a $C_{6-8}$ cycloalkylene group, a $C_{6-14}$ alkylcycloalkylene, a heterocyclic group, or —[(—CHR—)$_p$—X—]$_q$—(—CHR—)$_r$—, wherein R is hydrogen or methyl and X denotes O, S, or —NHR—, wherein R denotes hydrogen or methyl; m is a rational number ranging from 1 to 50; n is an integer ranging from 1 to 60; p is an integer ranging from 2 to 6; q is an integer ranging from 1 to 5; and r is an integer ranging from 2 to 10.

In certain embodiments, the polythioether polymer that is present in the amine component of the primer systems of the present invention has the structure of formula (III), wherein, $R^1$ is —[(—CH$_2$)$_p$—X—]$_q$—(—CH$_2$)$_r$—, where p is 2, X is O, q is 2, r is 2, $R^2$ is ethylene, m is 2, and n is 9.

Polythioether polymers suitable for use in the amine component of the primer systems of the present invention are disclosed in U.S. Pat. No. 6,172,179 at col. 2, line 29 to col. 12, line 22, which is incorporated herein by reference.

In certain embodiments, the amine component also comprises a liquid vehicle, such as an organic solvent, such as those listed earlier with respect to the epoxy component. In certain embodiments, the amine component may comprise from 0.1 to 99 weight percent amine; 1 to 99 weight percent, such as 1 to 20 weight percent, polythioether polymer; and up to 60 weight percent solvent, based on the total weight of the amine component.

In certain embodiments, the amine component may also comprise other materials that can react with the curable resinous polyepoxide of the epoxy component. Examples of such materials include polyacids, polyanhydrides, and polythiols other than the polythioether polymers described earlier. As used herein, the term "polyacid" refers to compound having at least two reactive acid groups per molecule. The acid functionality can be a carboxylic acid or a sulfonic acid. In certain embodiments, the polyacid comprises a carboxyl-terminated compound having at least two carboxyl groups per molecule. Example of suitable polyacids include carboxylic acid group-containing polymers, such as acrylic polymers, polyesters, and polyurethanes; and oligomers, such as ester group-containing oligomers and monomers.

Examples of carboxylic acid-containing acrylic polymers are copolymers of (a) an ethylenically unsaturated monomer containing at least one carboxylic acid group, and (b) a different ethylenically unsaturated monomer that is free from carboxylic acid groups. In certain embodiments, the amounts of monomer (a) and monomer (b) are selected such that the acid number of the polyacid acrylic polymer is from 30 to 150, such as 60 to 120. Examples of carboxylic acid-containing acrylic monomers are acrylic acid, methacrylic acid, maleic acid, and partial esters of maleic acid. The other monomeric component (b) is characterized by the group,

and may be styrene, an alpha-substituted lower alkyl styrene, such as alpha-methylstyrene, an alkyl ester of acrylic or methacrylic acid, such as methyl methacrylate, methyl acrylate, and ethyl acrylate, and mixtures thereof.

In certain embodiments, the polyacid may comprise a monomeric polycarboxylic acid having from 5 to 20 carbon atoms, such as open chain, cyclic, saturated, unsaturated, and aromatic acids. Examples of suitable monomeric polycarboxylic acids include succinic acid, adipic acid, azelaic acid, sebacic acid, hexahydrophthalic acid, maleic acid, cyclohexene-1,2-dicarboxylic acid, and phthalic acid.

As previously indicated, in the epoxy-amine primer systems of the present invention, the amine component and the epoxy component are mixed at or near the time of use. The mixture has a useful life of several hours before it becomes too viscous to apply. In certain embodiments, the epoxy-amine primer systems of the present invention comprise the amine component and epoxy component in a one-to-one weight ratio, or in a ratio of 0.8 to 1.5.

In certain embodiments, either or both of the epoxy component and the amine component further comprise a corrosion inhibitor. Suitable corrosion inhibitors include inorganic, finely divided chromate pigments, such as calcium chromate, strontium chromate, red chromate, zinc chromate, magnesium chromate, and barium chromate, alone or in combination. If added to the amine component, and/or epoxy component, the corrosion inhibitor is typically present in an amount of 5 to 50 weight percent of the primer.

In certain embodiments, either or both of the epoxy component and the amine component further comprise one or more siliceous materials, such as, for example, silica, clay, such as bentone clay, talc, and the like. The average particle size of the siliceous material varies depending on the material chosen, but typically ranges from 0.01 to 20 microns. In other embodiments, one or more siliceous materials are used, wherein one or more of these materials have been pre-reacted with a polyalkoxysilane or siloxane having at least one active hydrogen atom that is reactive with the epoxy group of the resinous polyepoxide. If added to the epoxy component, the siliceous material(s) are, in certain embodiments, present in an amount of 2 to 20 weight percent, based on the total weight of the epoxy component; if added to the amine component, the siliceous material(s) are, in certain embodiments, present in an amount of 2 to 20 weight percent, based on the total weight of the amine component.

If desired, other additives can be included in either or both of the amine component and the epoxy component, including plasticizers, pigments, cure accelerators, adhesion promoters, thixotropic agents, fire retardants, masking agents, antioxidants, surfactants, and other additives known to those skilled in the art. When used, these additives may, in certain embodiments, comprise 0.1 to 50 weight percent of the epoxy and/or amine component. Suitable plasticizers, for example, include phthalate esters, chlorinated paraffins, and hydrogenated terphenyls. Examples of useful plasticizers include HB-40® modified polyphenyl (Solutia, Inc.) and tung oil (Campbell & Co.). In certain embodiments, the plasticizer comprises 1 to 40 weight percent, such as 1 to 8 weight percent, based on the total weight of the primer system.

The primer system can be applied to any suitable substrate and is particularly suitable for metal substrates, particularly aluminum. The present invention, therefore, is also directed to substrate at least partially coated with the primer system of the present invention. Moreover, the present invention is directed to methods for coating a substrate with the primer system of the present invention, which methods comprise the steps of applying the primer system to the substrate, coalescing the primer system over the substrate in the form of a substantially continuous film, and curing the primer system.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Preparation of Multi-Component Epoxy-Amine Primer System

A multi-component epoxy-amine primer system was prepared from an epoxy component and an amine component as follows.

Preparation of Epoxy Component

A mixture of 86.1 parts of Epon™ 828 epoxy resin (from Resolution Performance Products), 52.5 parts of Epon™ 8111 acrylic modified epoxy resin (from Resolution Performance Products), and 20 parts methyl ethyl ketone was prepared by mixing the above component in a suitable vessel.

Preparation of Amine Component

A mixture of 114 parts Ancamide™ 2569 polyamide (from Air Products and Chemicals, Inc.), 6 parts Permapol® polythioether (from PRC-Desoto International, Inc.), 14 parts Ancamine 2432 aliphatic amine adduct (from Air Products and Chemicals, Inc.), 4.6 parts K-54 tertiaryamine (from Air Products and Chemicals, Inc.), and 33 parts butanol was prepared by mixing the above component in a suitable vessel.

Example 2

Application of Primer System to a Test Substrate

The epoxy and amine components prepared in Example 1 were mixed together and applied to aluminum test panels by spray application using conventional pressure pot equipment or HVLP equipment. Applicant thickness was 0.6 to 2 mils. The panels were air dried for 7 days. The flexibility of the resulting primer was evaluated using a Gardner impact tester and passed 60 in-lb forward and reverse.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A multi-component epoxy-amine primer system comprising:
   (a) an epoxy component comprising a curable resinous polyepoxide, and
   (b) an amine component comprising:
      (i) an amine, and
      (ii) a mercapto-terminated polythioether polymer comprising the reaction product of reactants comprising a polythiol and a polyvinyl ether.

2. The multi-component epoxy-amine primer system of claim 1, wherein the curable resinous polyepoxide has a molecular weight of 250 to 1500.

3. The multi-component epoxy-amine primer system of claim 1, wherein the curable resinous epoxide comprises from 10 to 30 weight percent of the epoxy component.

4. The multi-component epoxy-amine primer system of claim 1, further comprising a resin different from the curable resinous polyepoxide.

5. The multi-component epoxy-amine primer system of claim 4, wherein the resin different from the curable resinous polyepoxide comprises an epoxy resin.

6. The multi-component epoxy-amine primer system of claim 1, wherein the amine comprises a diamine.

7. The multi-component epoxy-amine primer system of claim 6, wherein the diamine is selected from 1,2-ethylene diamine, 1,2-propylene diamine, 1,8-p-menthane diamine, isophorone diamine, propane-2,2-cyclohexyl amine, and methane-bis-(4-cyclohexyl amine), or

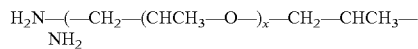

wherein x is from 1 to 10, including mixtures thereof.

8. The multi-component epoxy-amine primer system of claim 1, wherein the polythiol material comprises a dithiol having the formula:

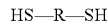

where R is a $C_{2-10}$ n-alkylene group; a $C_{2-6}$ branched alkylene group; a $C_{6-8}$ cycloalkylene group; a $C_{6-10}$ alkylcycloalkylene group; or a $—[(—CHR—)_p—X—]_q—(—CHR—)_r—$ group; wherein p is an integer ranging from 2 to 6, q is an integer ranging from 1 to 5, r is an integer ranging from 2 to 10, R is hydrogen or methyl, and each X is selected from O, S or —NR—, where R is hydrogen or methyl.

9. The multi-component epoxy-amine primer system of claim 1, wherein the polythioether polymer has the structure of formula:

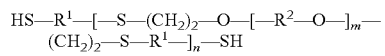

wherein $R^1$ is a $C_{2-10}$ n-alkylene group, a $C_{2-6}$ branched alkylene group, a $C_{6-8}$ cycloalkylene group, a $C_{6-10}$ alkylcycloalkylene group, a heterocyclic group, or $—[(—CHR—)_p—X—]_q—(—CHR—)_r—$, wherein R is hydrogen or methyl, and X denotes O, S, or —NHR—, wherein R denotes hydrogen or methyl; $R^2$ denotes a $C_{2-10}$ n-alkylene group, a $C_{2-6}$ branched alkylene group, a $C_{6-8}$ cycloalkylene group, a $C_{6-14}$ alkylcycloalkylene, a heterocyclic group, or $—[(—CHR—)_p—X—]_q—(—CHR—)_r—$, wherein R is hydrogen or methyl, and X denotes O, S, or —NHR—, wherein R denotes hydrogen or methyl; m is a rational number ranging from 1 to 50; n is an integer ranging from 1 to 60; p is an integer ranging from 2 to 6; q is an integer ranging from 1 to 5; and r is an integer ranging from 2 to 10.

10. The multi-component epoxy-amine primer system of claim 9, wherein the $R^1$ is $—[(—CH_2)_p—X]_q—(—CH_2)_r—$, where p is 2, X is O, q is 2, r is 2, $R^2$ is ethylene, m is 2, and n is 9.

11. The multi-component epoxy-amine primer system of claim 1, wherein the amine component and epoxy component are present in a one-to-one weight ratio.

12. The multi-component epoxy-amine primer system of claim 1, wherein at least one of the amine component and the epoxy component further comprise a corrosion inhibitor.

13. The multi-component epoxy-amine primer system of claim 12, wherein the corrosion inhibitor comprises chromate.

14. The multi-component epoxy-amine primer system of claim 13, wherein the corrosion inhibitor comprises strontium chromate.

15. The multi-component epoxy-amine primer system of claim 1, wherein at least one of the epoxy component and the amine component further comprise a siliceous material selected from, silica, clay, or a mixture thereof.

16. A substrate at least partially coated with the multi-component epoxy-amine primer system of claim 1.

17. The substrate of claim 16, wherein the substrate comprises a metal substrate.

18. The substrate of claim 17, wherein the metal substrate comprises aluminum.

19. A method of coating a substrate comprising:
   (a) applying the multi-component epoxy-amine primer system of claim 1 to at least a portion of the substrate,
   (b) coalescing the primer system over the substrate in the form of a substantially continuous film, and
   (c) curing the primer system.

* * * * *